United States Patent
Hamaguchi et al.

(10) Patent No.: US 12,312,169 B2
(45) Date of Patent: May 27, 2025

(54) PLANE STORAGE FACILITY

(71) Applicant: Daifuku Co., Ltd., Osaka (JP)

(72) Inventors: Jun Hamaguchi, Osaka (JP); Suguru Nakamura, Osaka (JP); Toshiyuki Yokohara, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 62 days.

(21) Appl. No.: 18/266,078

(22) PCT Filed: Nov. 30, 2021

(86) PCT No.: PCT/JP2021/043874
§ 371 (c)(1),
(2) Date: Jun. 8, 2023

(87) PCT Pub. No.: WO2022/124141
PCT Pub. Date: Jun. 16, 2022

(65) Prior Publication Data
US 2024/0092571 A1 Mar. 21, 2024

(30) Foreign Application Priority Data
Dec. 9, 2020 (JP) .................................. 2020-204151

(51) Int. Cl.
*B65G 1/137* (2006.01)
*B65G 1/04* (2006.01)
(52) U.S. Cl.
CPC .................................. *B65G 1/0464* (2013.01)
(58) Field of Classification Search
CPC ...... B65G 1/10464; B65G 1/04; B65G 1/137; B65G 61/00; B65C 13/48

USPC .......................................... 414/626
See application file for complete search history.

(56) References Cited

U.S. PATENT DOCUMENTS

| | | | | | |
|---|---|---|---|---|---|
| 2,165,513 | A | * | 7/1939 | Smith | F25D 13/02 62/331 |
| 5,007,785 | A | * | 4/1991 | van der Schoot | B65G 61/00 414/331.11 |
| 6,694,767 | B2 | * | 2/2004 | Junca | F25D 25/02 62/266 |
| 9,151,770 | B2 | * | 10/2015 | Reuteler | A01N 1/0263 |
| 9,238,558 | B2 | * | 1/2016 | Houck | B65H 3/44 |
| 10,414,585 | B2 | * | 9/2019 | Hamaguchi | B65G 1/137 |
| 11,203,487 | B2 | * | 12/2021 | Lindbo | E04B 1/94 |
| 11,807,455 | B2 | * | 11/2023 | Wolf | G06Q 10/08 |
| 2017/0355525 | A1 | | 12/2017 | Hamaguchi | |

FOREIGN PATENT DOCUMENTS

| | | | |
|---|---|---|---|
| JP | 2182607 A | 7/1990 | |
| JP | 6135516 A | 5/1994 | |
| JP | 2016210526 A | 12/2016 | |
| JP | 201843804 A | 3/2018 | |
| WO | WO-2016174881 A1 * | 11/2016 | B65G 1/04 |

* cited by examiner

*Primary Examiner* — Douglas A Hess
(74) *Attorney, Agent, or Firm* — The Webb Law Firm

(57) ABSTRACT

A control apparatus receives designation of a target position (Pt) in a storage plane (F); and, in response to the target position (Pt) being designated, the control apparatus can execute a passage formation mode for forming a passage (R). In the passage formation mode, a passage area (AR) for ensuring a passage (R) is set, and all target articles (C) placed in the passage area (AR) are moved to a location outside of the passage area (AR) in the storage plane (F) by a conveying apparatus.

20 Claims, 11 Drawing Sheets

PLANE STORAGE FACILITY

CROSS-REFERENCE TO RELATED APPLICATIONS

This application is the United States national phase of International Application No. PCT/JP2021/043874 filed Nov. 30, 2021, and claims priority to Japanese Patent Application No. 2020-204151 filed Dec. 9, 2020, the disclosures of which are hereby incorporated by reference in their entireties.

BACKGROUND OF THE INVENTION

Field of the Invention

The present invention relates to a plane storage facility including a storage plane on which a plurality of target articles are placed and stored, a conveying apparatus for moving the target articles within the storage plane, and a control apparatus for controlling the operation of the conveying apparatus.

Description of Related Art

An example of such a plane storage facility is disclosed in Japanese Patent Application Laid-Open No. 2016-210526 (Patent Document 1). Reference numerals in parentheses in the description of the background art below refer to Patent Document 1.

In the technique disclosed in Patent Document 1, a placement plane (1) on which a plurality of articles (C) are placed and stored is divided into a plurality of small areas (SAa1 to SAb4) by a plurality of passage regions (PAa1 to PAb3). As a result, when the stored articles (C) placed in the small areas (SAa1 to SAb4) are to be immediately unloaded through a manual task performed by a worker, the worker can use the passage regions (PAa1 to PAb3) to quickly reach the position where the articles (C) to be immediately unloaded are placed. As described above, in the technique disclosed in Patent Document 1, convenience when a worker is to reach a desired position during an emergency is improved by forming the passage regions (PAa1 to PAb3) through which the worker can pass on the placement plane (1) on which the stored articles (C) are placed.

PATENT DOCUMENT

Patent Document 1: JP 2016-210526A

However, in the technique disclosed in Patent Document 1, since a plurality of passage regions (PAa1 to PAb3) where the stored articles (C) are not placed are formed on the placement plane (1), there is room for improvement in terms of the storage efficiency of the stored articles (C).

SUMMARY OF THE INVENTION

In view of the above-mentioned circumstance, it is desirable to realize a plane storage facility in which it is possible to improve the storage efficiency of target articles in a storage plane where a plurality of target articles are stored, and it is possible to form a passage through which a worker can pass as needed.

The plane storage facility according to the present disclosure includes:
a storage plane on which a plurality of target articles are placed and stored;
a conveying apparatus configured to move the target articles within the storage plane; and
a control apparatus configured to control operation of the conveying apparatus,
in which the control apparatus receives designation of a target position within the storage plane, and in response to the target position being designated, is capable of executing a passage formation mode for forming a passage that connects an outer edge of the storage plane to the target position and through which a worker is capable of passing, and
in the passage formation mode, the control apparatus sets a passage region for ensuring the passage, and moves all of the target articles placed in the passage region to a location outside of the passage area in the storage plane with the conveying apparatus.

According to this configuration, it is not necessary to ensure a passage through which a worker can pass on the storage plane. For this reason, compared to the case of ensuring such a passage, it is possible to ensure a wider region that can be used for storing the target articles, and it is possible to improve the storage efficiency of the target articles. Also, according to this configuration, if the target position is designated on the storage plane, the passage formation mode for forming a passage connecting the outer edge of the storage plane to the target position is executed. This makes it possible to form a passage for the worker to reach any target position using the conveying apparatus. For example, if there is a load collapse of the target articles or the like in a portion of the storage plane and it becomes necessary for the worker to perform a task at the position where the load collapse or the like occurred, it is possible to set the position where the load collapse or the like occurred as a target position and form a passage to the target position. As described above, according to this configuration, it is possible to realize a plane storage facility in which it is possible to improve the storage efficiency of the target articles in the storage plane in which a plurality of target articles are stored, and form a passage through which a worker can pass as needed.

Further features and advantages of the technology according to the present disclosure will become clearer from the following description of exemplary and non-limiting embodiments described with reference to the drawings.

DESCRIPTION OF THE INVENTION

A plane storage facility according to this embodiment will be described with reference to the drawings.

[Mechanical Configuration of Plane Storage Facility]

Figure 1:
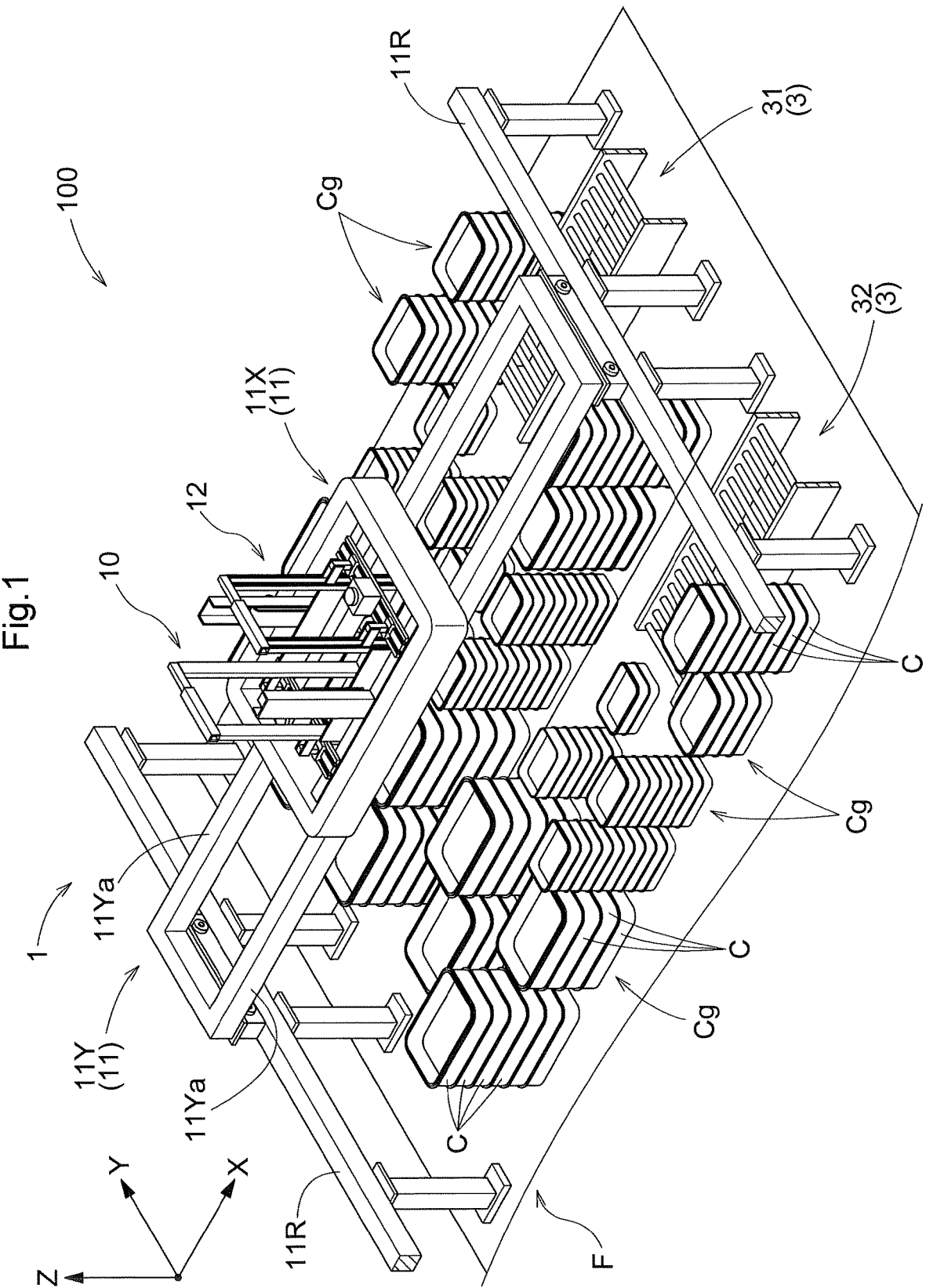
FIG. 1 is a schematic perspective view of a plane storage facility.

As shown in FIG. 1, a plane storage facility 100 includes a storage plane F on which a plurality of containers C are placed and stored, a conveying apparatus 1 for moving the containers C within the storage plane F, and a control apparatus 2 (see FIG. 5) for controlling operations of the conveying apparatus 1. In this embodiment, the plane storage facility 100 places and stores a single container C or a container group Cg formed by stacking a plurality of containers C, on a storage plane F. In the plane storage facility 100, a container C containing a contained object such as a component or an empty container C containing no contained object is stored as a target article. That is, in this embodiment, the target article is a container C, a plurality of which can be stacked, and the container C corresponds to the "target article".

Hereinafter, directions that extend along the storage plane F and are perpendicular to each other will be referred to as an X direction and a Y direction, and a direction perpendicular to the storage plane F will be referred to as a Z direction. The X direction and the Y direction are directions along the horizontal direction, and the Z direction is a direction along the up-down direction.

Figure 2:
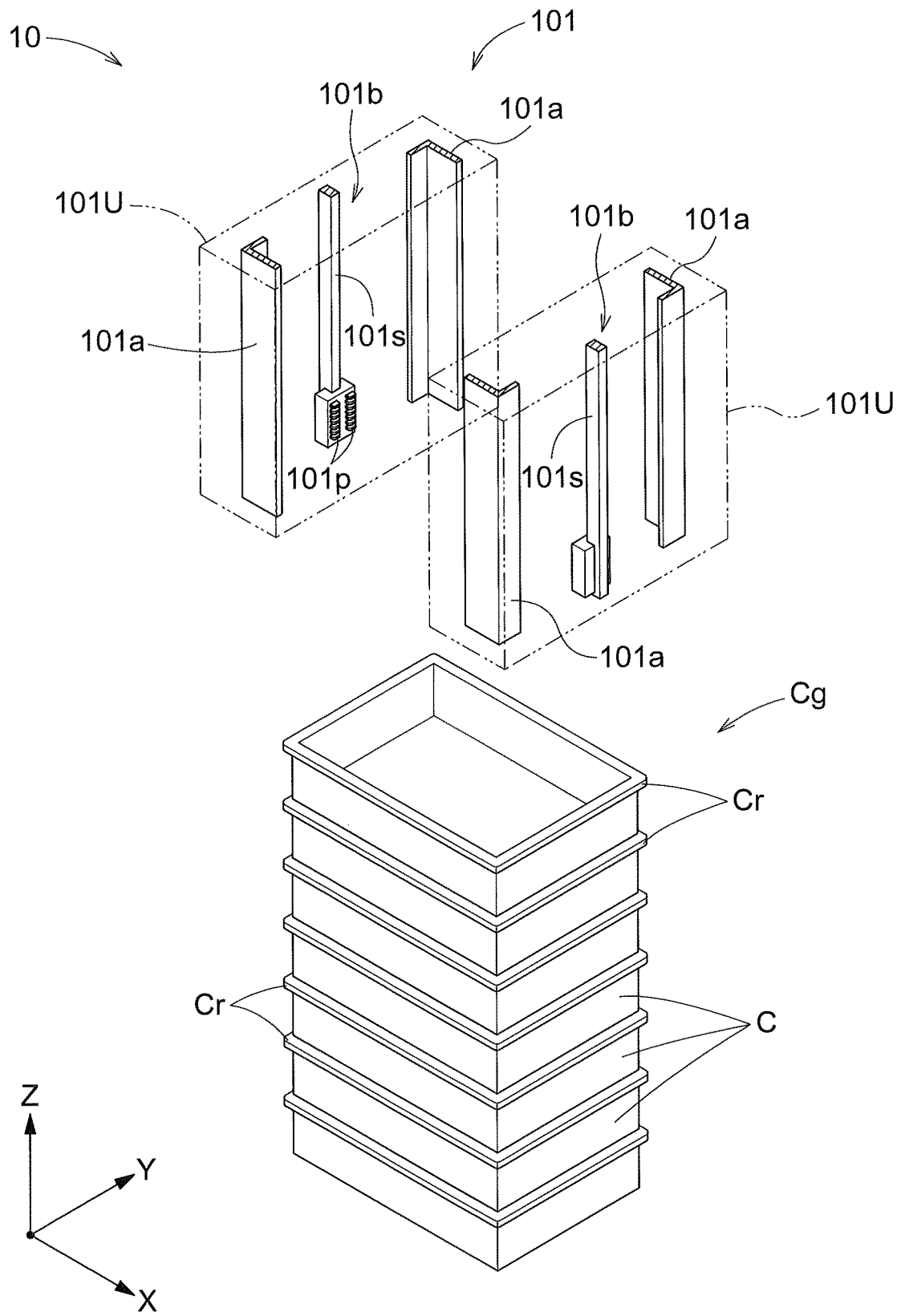
FIG. 2 is a diagram showing an operation of a gripping portion.
Figure 3:
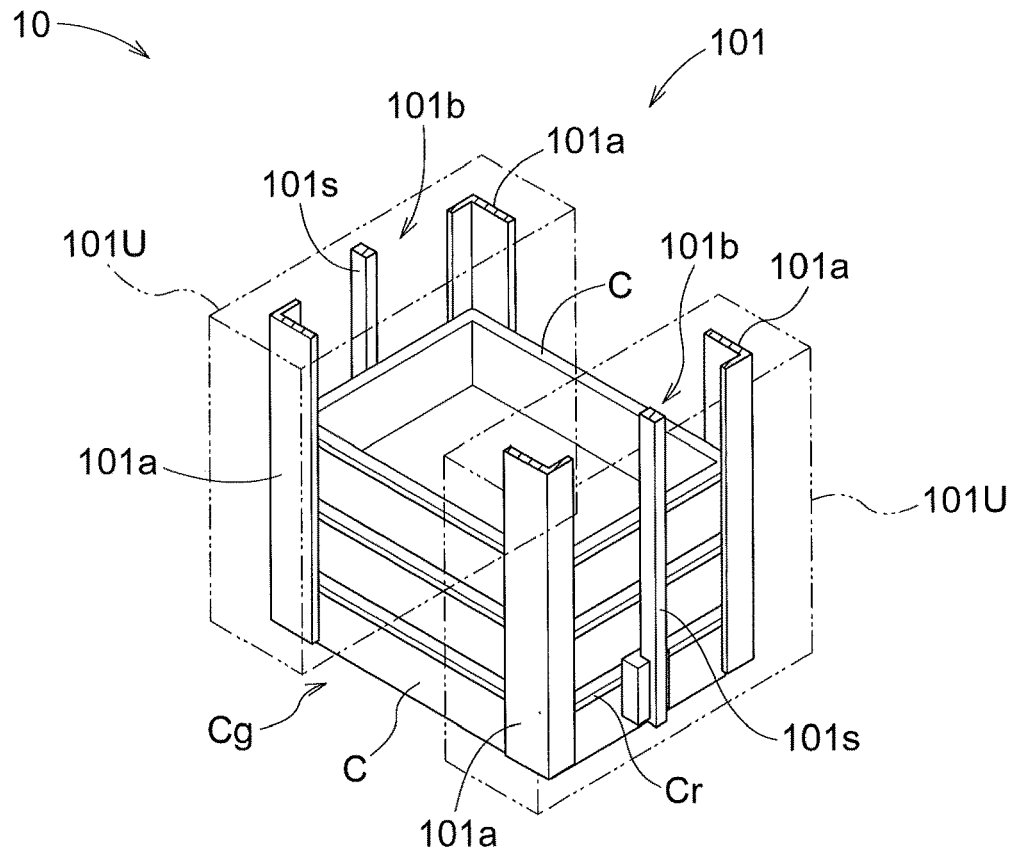
FIG. 3 is a diagram showing the operation of the gripping portion.
Figure 3:
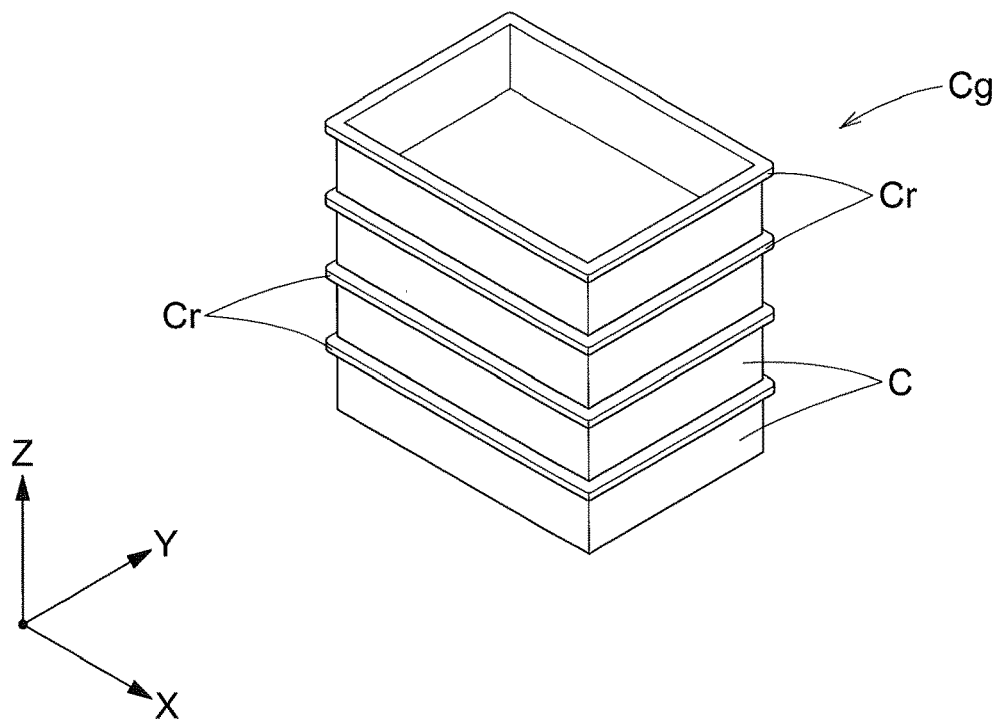

In the present embodiment, as shown in FIGS. 1 to 3, the conveying apparatus 1 includes a gripping portion 101 that grips a container C, a moving mechanism 11 that moves the gripping portion 101 in the X direction and the Y direction, and an elevating mechanism 12 that raises and lowers the gripping portion 101 along the Z direction.

In this embodiment, the moving mechanism 11 includes a pair of fixed guide rails 11R that are arranged along the Y direction at positions spaced apart in the X direction on the storage plane F and are fixed to the storage plane F, a Y-direction moving body 11Y that is supported by the pair of fixed guide rails 11R and moves the gripping portion 101 along the Y direction, and an X-direction moving body 11X that is supported by the Y-direction moving body 11Y and moves the gripping portion 101 along the X direction.

In this embodiment, the Y-direction moving body 11Y is constituted by a movable rail extending along the X direction. In the illustrated example, the movable rail has a pair of rail portions 11Ya arranged parallel to each other. Both ends in the X direction of the Y-direction moving body 11Y are movably supported with respect to the fixed guide rails 11R, and the Y-direction moving body 11Y moves in the Y direction along the fixed guide rails 11R. The Y-direction moving body 11Y is driven by a Y-direction movement driving unit (not shown) constituted by, for example, a motor.

In this embodiment, the X-direction moving body 11X is constituted by a cart that travels along the movable rails forming the Y-direction moving body 11Y. The X-direction moving body 11X moves along the X direction by traveling along the Y-direction moving body 11Y extending along the X-direction. The X-direction moving body 11X is driven by an X-direction movement driving unit (not shown) constituted by, for example, a motor.

The gripping portion 101 is supported by the X-direction moving body 11X. For this reason, due to the X-direction moving body 11X moving along the X-direction, the gripping portion 101 supported by the X-direction moving body 11X also moves along the X-direction. Also, as described above, this X-direction moving body 11X is supported by the Y-direction moving body 11Y. For this reason, due to the Y-direction moving body 11Y moving along the Y-direction, the gripping portion 101 supported by the X-direction moving body 11X also moves along the Y-direction. In this manner, the gripping portion 101 is movable along the X direction and the Y direction.

The elevating mechanism 12 raises and lowers the gripping portion 101 along the Z direction, and in this example, is supported by the X-direction moving body 11X. Although not shown in detail, the elevating mechanism 12 includes a belt connected to the gripping portion 101 and an elevation driving unit (not shown) constituted by a motor or the like for driving the belt. Due to the belt being driven by the elevation driving unit, the gripping portion 101 is raised and lowered in the Z direction. In this manner, in the present embodiment, the gripping portion 101 is supported by the X-direction moving body 11X via the elevating mechanism 12.

In this embodiment, the conveying apparatus 1 includes a gripping mechanism 10. The gripping mechanism 10 includes the above-described gripping portion 101 and a gripping driving unit (not shown) that is constituted by, for example, a motor or the like and drives the gripping portion 101. The gripping portion 101 is driven by the gripping driving unit to change between a gripping state for gripping the container C and a non-gripping state for not gripping the container C.

As shown in FIGS. 2 and 3, in this embodiment, the gripping portion 101 includes a pair of gripping units 101U that move toward or away from each other in the X direction. Each of the pair of gripping units 101U is supported by the X-direction moving body 11X via the elevating mechanism 12 so as to move up and down between the pair of rail portions 11Ya of the Y-direction moving body 11Y in a synchronized manner. Each of the pair of gripping units 101U includes a pair of positioning tools 101a that are arranged side by side in the Y direction and move toward or away from each other in the Y direction, and a gripping tool 101b arranged between the pair of positioning tools 101a arranged side by side in the Y direction.

In this embodiment, the positioning tool 101a positions the container C by coming into contact with the outer edge of the container C from the outside in the gripping state of the gripping portion 101. In this example, a pair of positioning tools 101a provided in each of the pair of gripping units 101U, that is, a total of four positioning tools 101a, come into contact with the four corners of the container C having a rectangular planar shape. In the illustrated example, the plurality of positioning tools 101a are formed as columns having an L-shaped cross section along the horizontal plane so as to match the outer edge shape of each of the four corners of the container C.

In this embodiment, the gripping tool 101b grips a flange-shaped gripped portion Cr that protrudes over the entire circumference from the outer edge of the upper end portion of the container C. In this example, the gripper 101b includes a plurality of projections 101p that engage with the gripped portion Cr of the container C in the gripping state of the gripping portion 101, and a support member 101s that supports the plurality of projections 101p.

In this embodiment, the support member 101s is formed in a columnar shape extending along the Z direction, and supports the plurality of projections 101p in its lower end region. The plurality of projections 101p supported by the support member 101s are arranged side by side in the Z direction in the lower end region of the support member 101s, and protrude toward another support member 101s (inward) arranged facing the X direction. In this example, a plurality of protrusions 101p arranged side by side in the Z direction are arranged side by side in a plurality of rows (two rows in the example shown in FIG. 2) in the Y direction.

Figure 4:
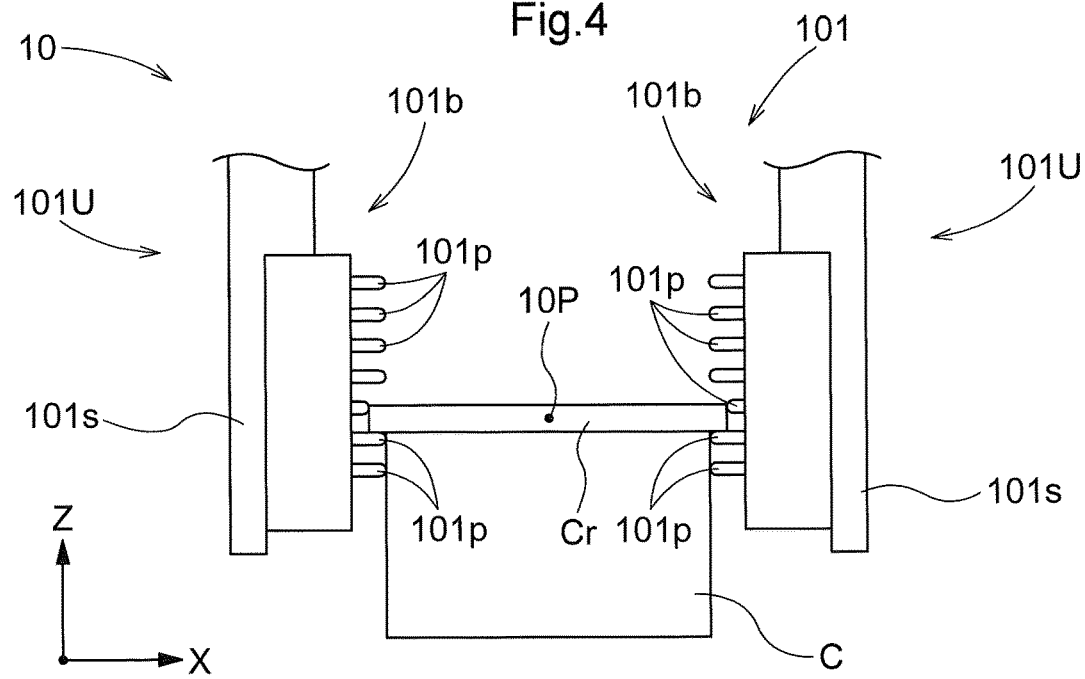
FIG. 4 is a diagram showing a state in which a container is gripped by the gripping portion.

Each of the plurality of protrusions 101p is biased by a spring in a direction of protruding inward (toward the other support member 101s). Accordingly, as shown in FIG. 4, in the gripping state of the gripping portion 101, some of the plurality of projections 101p receive a reaction force from the gripped portion Cr of the container C, and thereby are pulled outward against the force of the spring, and some of the protrusions 101p arranged below the pulled-back protrusions 101p support the gripped portion Cr of the container C from below. Also, in this state, the positioning tool 101a comes into contact with or approaches the outer edge of the container C from the outside to position the container C in the X direction and the Y direction (see FIG. 3).

In this embodiment, the conveying apparatus 1 can move a single container C or a plurality of containers C forming a container group Cg at once. Specifically, when the gripping portion 101 grips one container C that is to be gripped, the conveying apparatus 1 moves only the gripped container C, or moves a plurality of containers C stacked on the gripped container C in addition to the gripped container C.

FIGS. 2 and 3 show an example in which the conveying apparatus 1 retrieves the top three containers C from a container group Cg constituted by seven containers C and moves them. The conveying apparatus 1 can separate and move one or more containers C from the container group Cg, and can place another one or more containers C that have been moved and stack them on the container group Cg.

Here, as described above, the containers C can be stacked in a plurality of levels to form a stacked state. As described above, in the present embodiment, the container C is formed in a rectangular shape in a plan view, but there is no limitation to this, and the container C may also be formed in a polygonal shape other than a rectangular shape, a circular shape, or an elliptical shape in a plan view. In addition, in the present embodiment, as shown in FIG. 1, it is possible to store a plurality of types of containers C having different bottom surface dimensions and/or heights on the storage plane F. In this example, as shown in FIG. 1, each container group Cg formed by stacking a plurality of containers C is constituted by containers C of the same type, which have the same bottom surface dimension and height. However, the container group Cg may be constituted by a plurality of different types of containers C as long as they can be stacked. Such a container C is, for example, a plastic container for storing contents such as parts to be used in a manufacturing line of a factory. In the plane storage facility 100, containers C containing such contents or empty containers C containing no contents are stored as target articles.

As shown in FIG. 1, in this example, the plane storage facility 100 includes a carry-in and carry-out apparatus 3 that conveys containers C (container group Cg) between the storage plane F and the outside of the storage plane F. The outside of the storage plane F is, for example, the above-described manufacturing line of a factory. In the example shown in FIG. 1, the carry-in and carry-out apparatus 3 includes a carry-in conveyor 31 for carrying in containers C from the outside of the storage plane F to the storage plane F, and a carry-out conveyor 32 for carrying out containers C from the storage plane F to the outside of the storage plane F. The conveying apparatus 1 delivers containers C to and from the carry-in and carry-out apparatus 3, here, the carry-in conveyor 31 and the carry-out conveyor 32, respectively. It should be noted that the carry-in and carry-out apparatus 3 is not limited to the configuration described above, and may also be formed by one conveyor. Also, the carry-in and carry-out apparatus 3 may be constituted by an apparatus other than a conveyor, such as a conveying cart.

Figure 8:
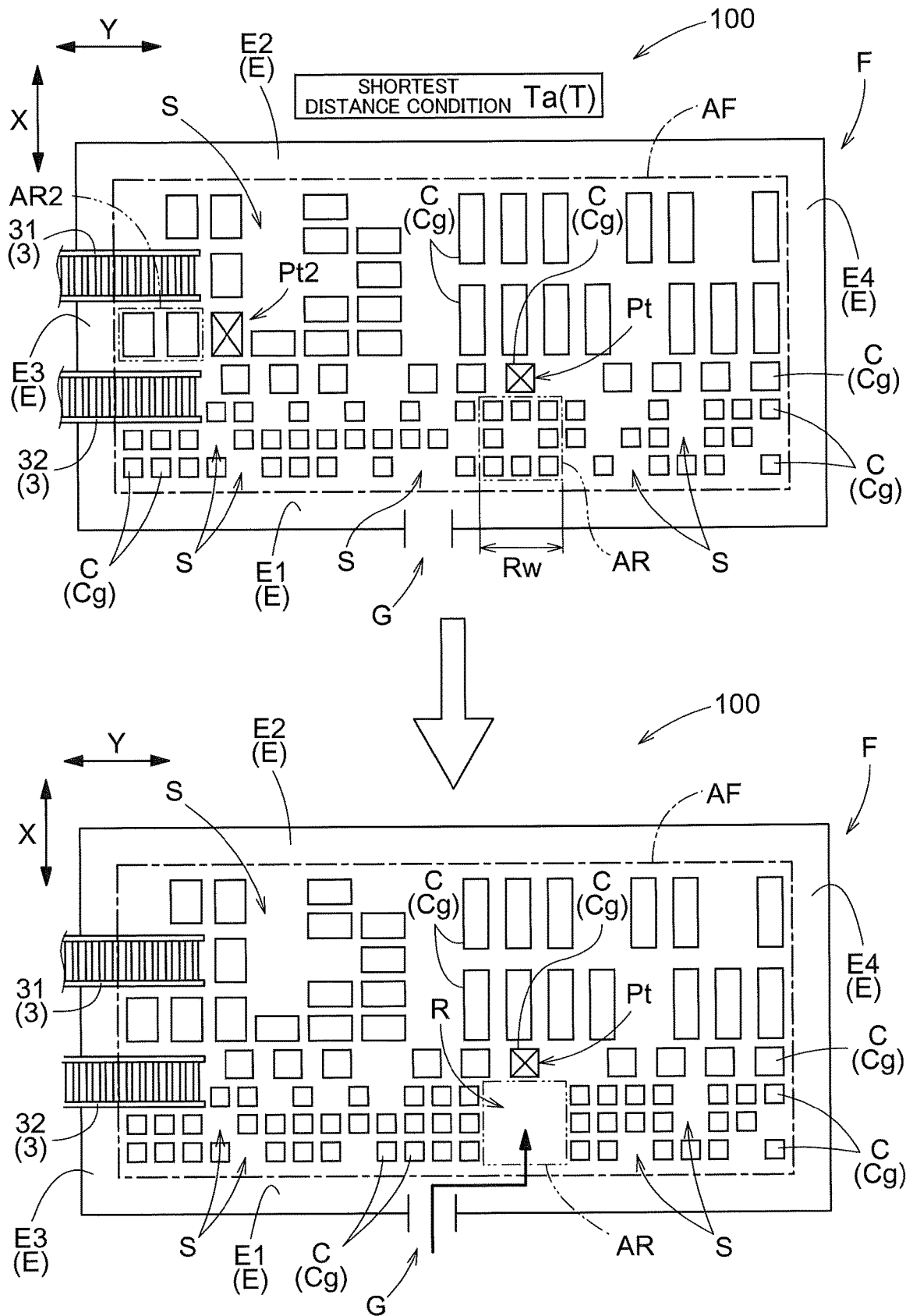
FIG. 8 is an explanatory diagram showing a case where the passage formation mode is executed under a shortest distance condition.

As shown in FIG. 8 and the like, the outer edge E of the storage plane F is an area where no containers C are placed. A region surrounded by the outer edge E in the storage plane F is a storage area AF in which the containers C can be placed. That is, the storage plane F includes an area (outer edge E) where no containers C are placed, and a storage area AF where the containers C can be placed.

The outer edge E can be passed through by workers.

In this embodiment, the storage plane F is formed in a rectangular shape, and the outer edge E is formed along the four sides of the rectangular storage plane F. In this example, the outer edge E includes a first outer edge E1, a second outer edge E2, a third outer edge E3, and a fourth outer edge E4 that form each side of the storage plane F.

In the illustrated example, the first outer edge E1 and the second outer edge E2 are arranged facing each other, and the third outer edge E3 and the fourth outer edge E4 are arranged facing each other.

Figure 9:
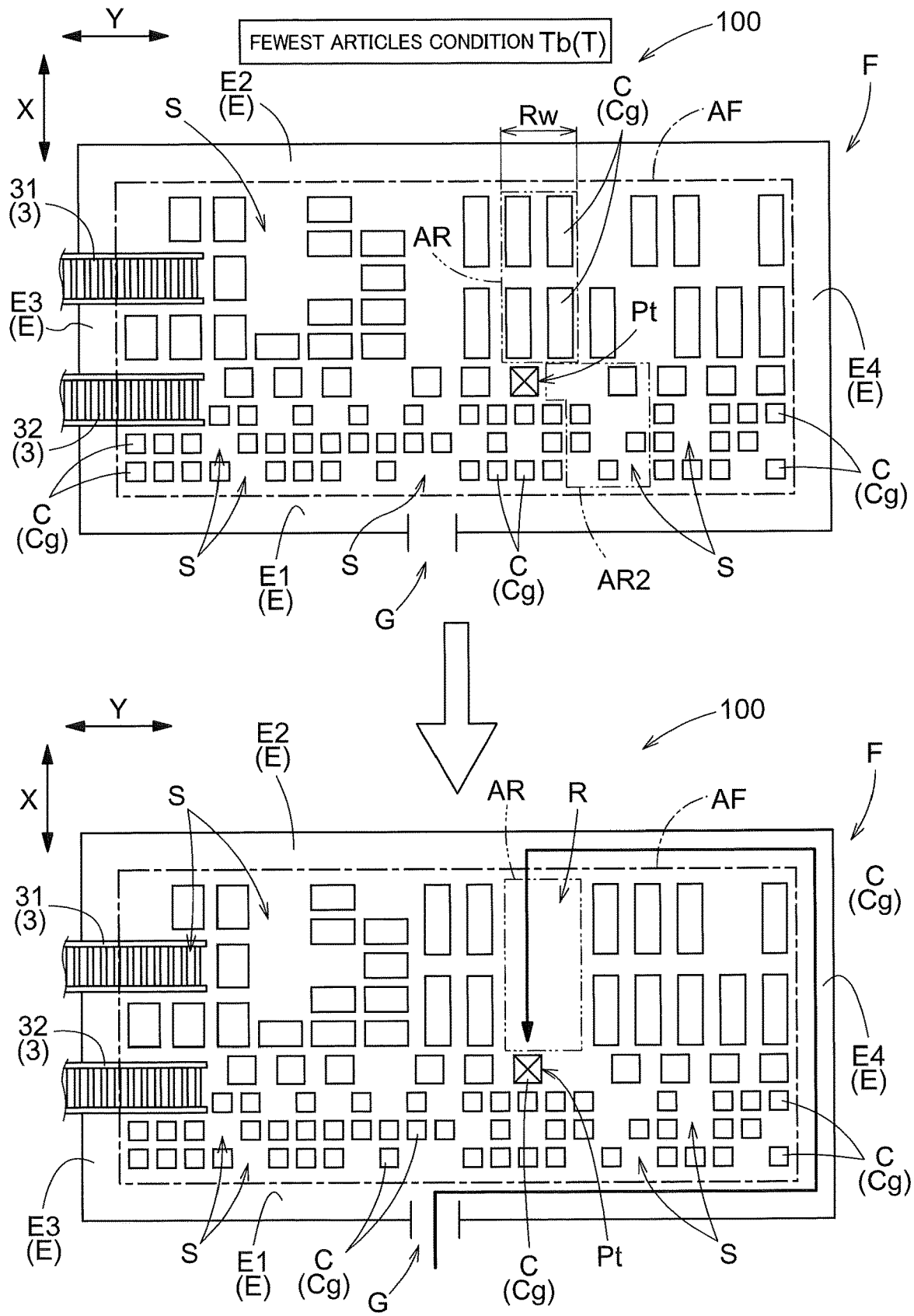
FIG. 9 is an explanatory diagram showing a case where the passage formation mode is executed under a fewest articles condition.
Figure 10:
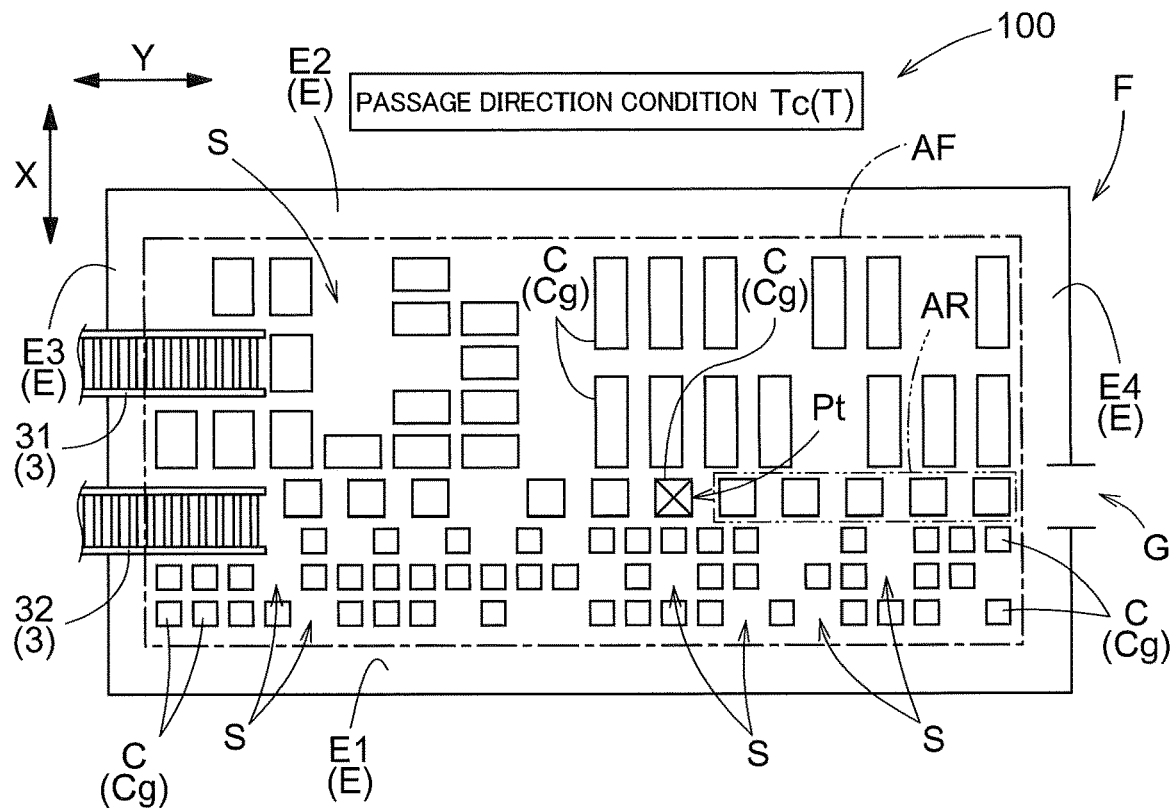
FIG. 10 is an explanatory diagram showing a case where the passage formation mode is executed under a passage direction condition.
Figure 10:
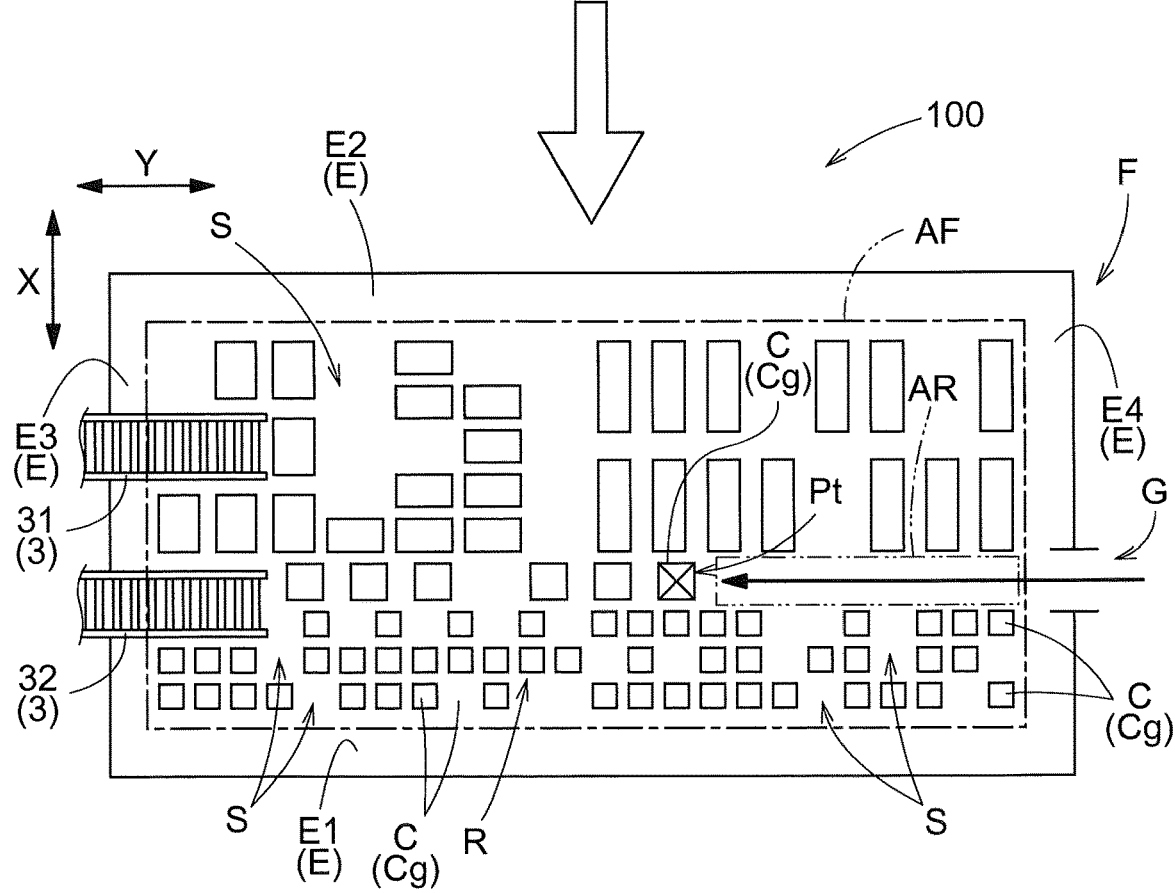
Figure 11:
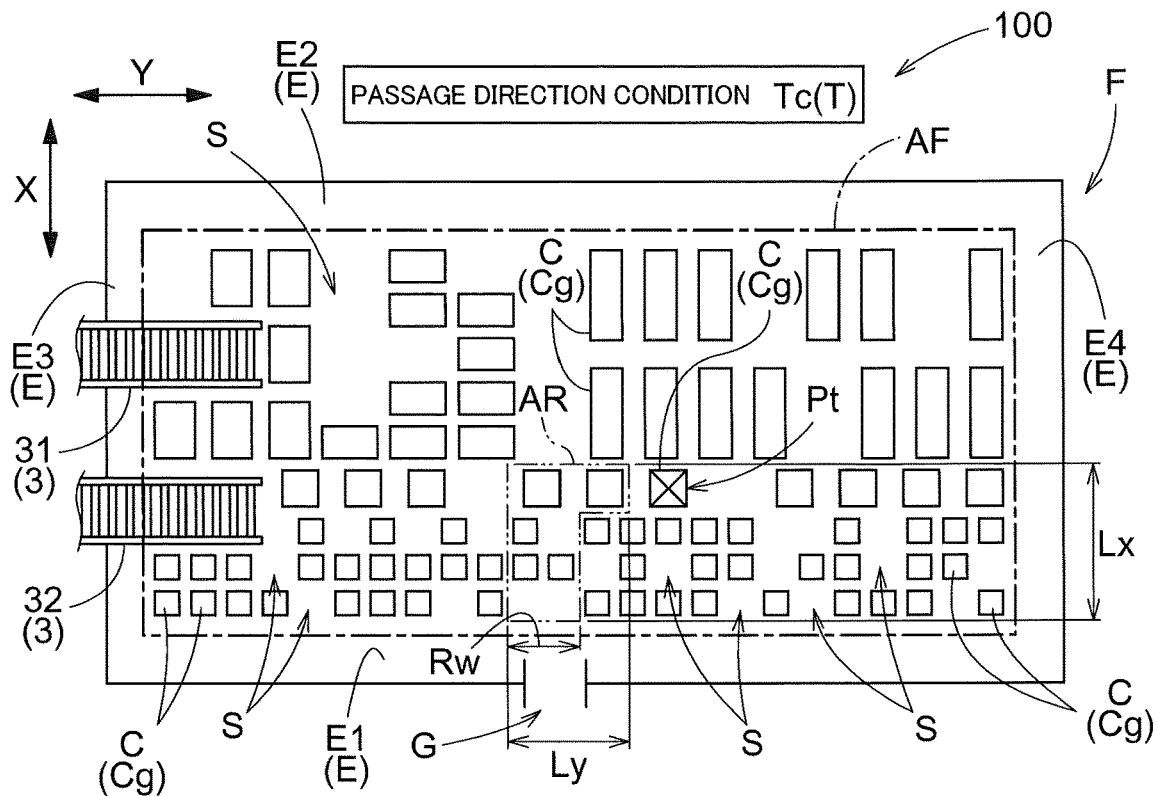
FIG. 11 is an explanatory diagram showing a case where the passage formation mode is executed under the passage direction condition.
Figure 11:
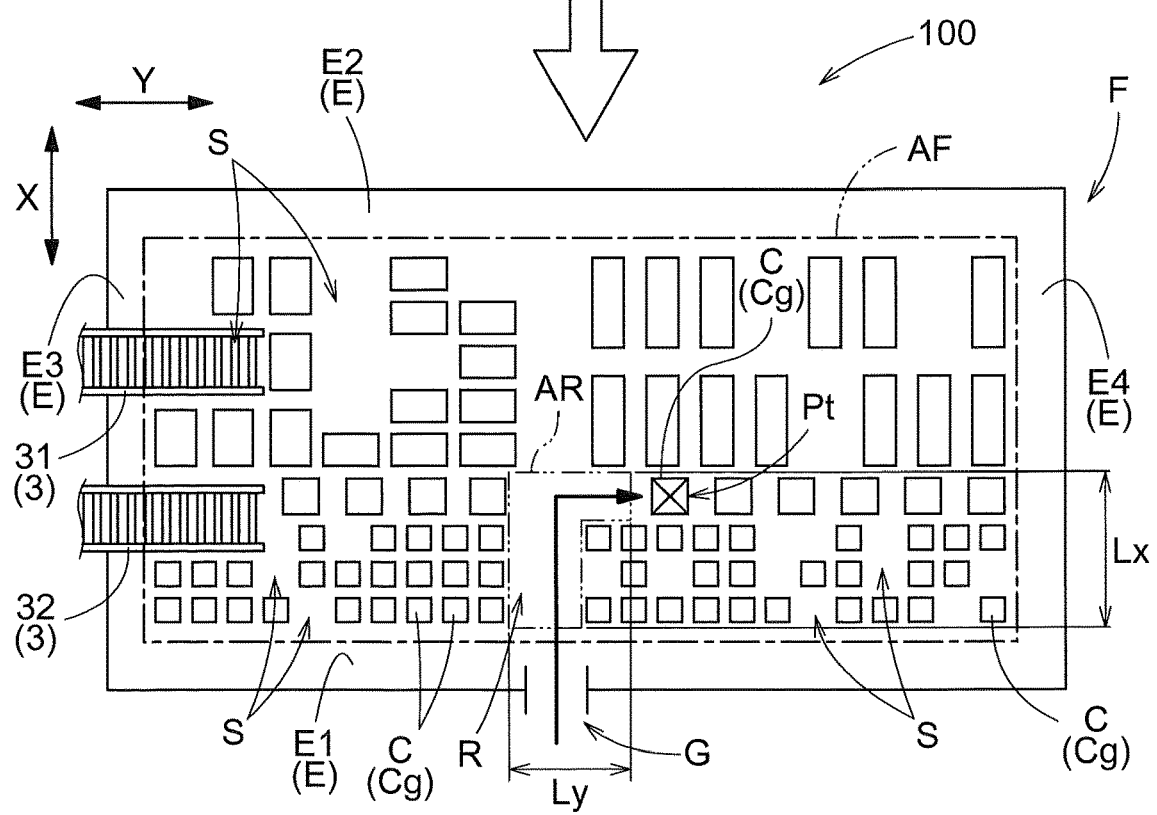

In this embodiment, an entrance G through which a worker is capable of entering and exiting is provided at one of the four sides forming the outer edge E. FIGS. 8, 9, and 11 show an example in which the entrance G is provided at the first outer edge E1. A worker can enter the storage plane F from the entrance G provided at the first outer edge E1, and pass through the first outer edge E1, the second outer edge E2, the third outer edge E3, and the fourth outer edge E4. Although detailed illustration is omitted, it is preferable that the storage plane F is surrounded by a fence, and a door that is normally closed is provided at the entrance G through which the storage plane F can be entered and exited. Note that FIG. 10 shows an example in which an entrance G is provided at the fourth outer edge E4.

[Control Configuration of Plane Storage Facility]

Figure 5:
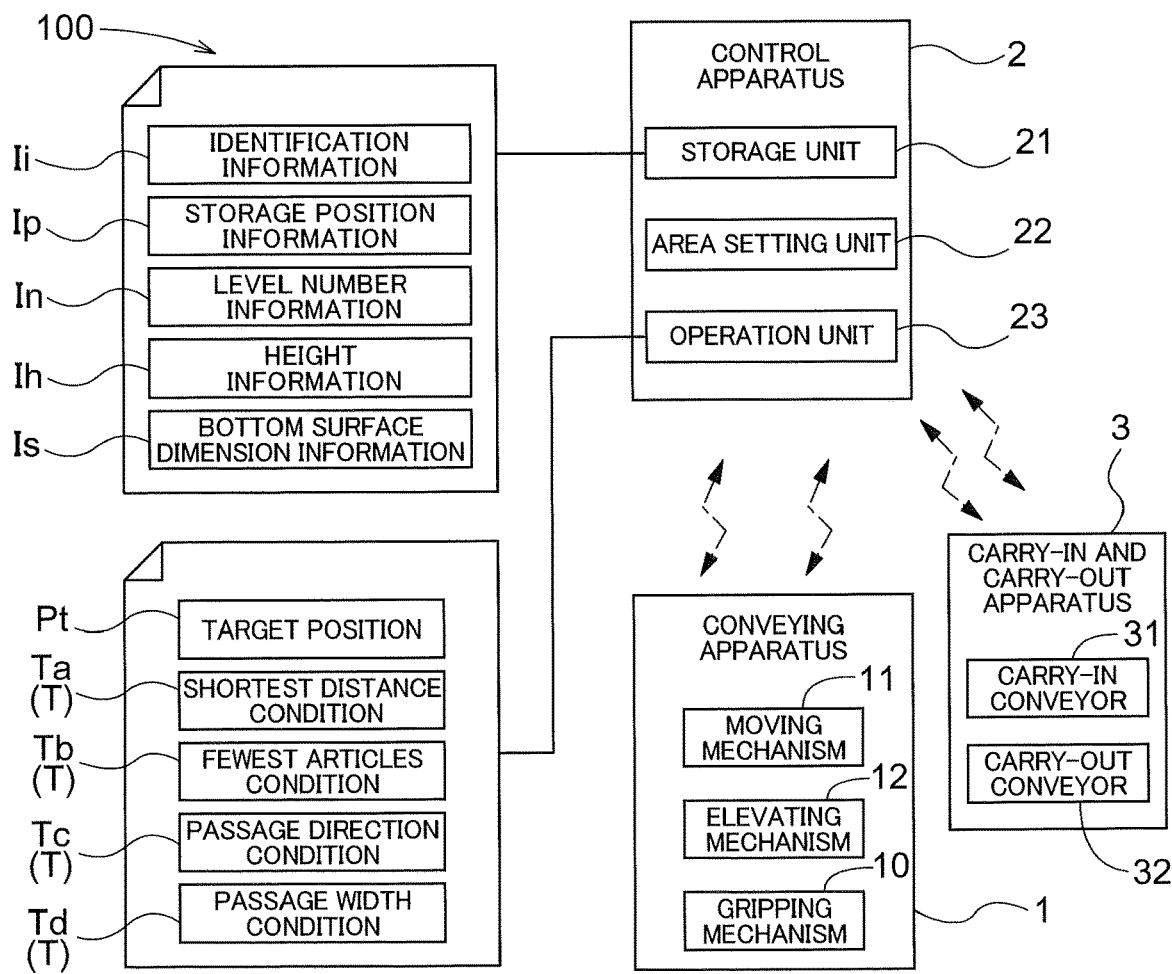
FIG. 5 is a control block diagram of the plane storage facility.

As shown in FIG. 5, the control apparatus 2 can communicate with the conveying apparatus 1 and control the conveying apparatus 1. In this example, the control apparatus 2 can also communicate with the carry-in and carry-out apparatus 3 and control the carry-in and carry-out apparatus 3. In addition, the control apparatus 2 performs overall control of the plane storage facility 100. In this embodiment, the control apparatus 2 manages the position of the container group Cg placed on the storage plane F, the types of the containers C forming the container group Cg, and the number of containers C forming the container group Cg (stacking number). Note that, in the present embodiment, even if a single container C is placed on the storage plane F, the control apparatus 2 manages the container C as a container group Cg in which the number of containers C forming the container group Cg (stacking number) is "1". The control apparatus 2 includes, for example, a processor such as a microcomputer, peripheral circuits such as a memory, and the like. Each function is realized through cooperation between these pieces of hardware and a program executed on a processor such as a computer.

In this embodiment, the control apparatus 2 includes a storage unit 21 that stores various types of information, and an area setting unit 22 that sets a passage area AR (see FIG. 8, etc.) in a later-described passage formation mode.

The storage unit 21 associates and stores identification information Ii for identifying each container C and storage position information Ip indicating the position where the container C is stored for all of the containers C stored on the storage plane F. As a result, the control apparatus 2 can keep track of the positions on the storage plane F where all of the containers C stored on the storage plane F are stored.

Also, in the present embodiment, the storage unit 21 stores level number-information In indicating the stacking number of a container C in the container group Cg and height information Ih indicating the height of the container C in association with the storage position information Ip. The control apparatus 2 can keep track of the number of containers C forming the container group Cg with the level number information In. Along with this, the control apparatus 2 can keep track of the height of each of the plurality of containers C forming the container group Cg with the height information Ih. Accordingly, the control apparatus 2 can keep track of the height of the container group Cg formed by stacking a plurality of containers C in association with the position where the container group Cg is stored. In this plane storage facility 100, the maximum height of the container group Cg on the storage plane F is determined in relation to the installation position of the conveying apparatus 1 so that the conveying apparatus 1 in operation does not interfere with the container group Cg. Alternatively, the maximum height of the container group Cg is set to a height such that the container group Cg stored on the storage plane F can be placed stably. The control apparatus 2 according to the present embodiment manages the number of containers C forming the container group Cg so as not to exceed the above-described maximum height.

In this embodiment, the storage unit 21 stores the bottom surface dimension information Is indicating the bottom surface dimension of the container C in association with the storage position information Ip. As a result, the control apparatus 2 can keep track of the region on the storage plane F occupied by the containers C (container groups Cg) placed on the storage plane F, and the positions of the containers C (container groups Cg).

The control apparatus 2 can execute carry-in control for carrying in a container group Cg from the outside of the storage plane F to the storage plane F, and carry-out control for carrying out the container group Cg from the storage plane F to the outside of the storage plane F. In this embodiment, the control apparatus 2 controls the conveying apparatus 1 and the carry-in and carry-out apparatus 3 to execute carry-in control or carry-out control.

Specifically, in the carry-in control, the container group Cg carried in from outside the storage plane F by the carry-in conveyor 31 is carried into the storage plane F by the conveying apparatus 1 and is placed directly on the storage plane F, or on top of another container group Cg already placed on the storage plane F. Then, the control apparatus 2 causes the storage unit 21 to store the storage position information Ip of the container group Cg that was carried in.

In the carry-out control, the container group Cg is retrieved from the storage plane F by the conveying apparatus 1, placed on the carry-out conveyor 32, and carried to the outside of the storage plane F by the carry-out conveyor 32. Then, the control apparatus 2 causes the storage unit 21 to delete the storage position information Ip of the container group Cg that was carried out. The container group Cg carried to the outside of the storage plane F is, for example, conveyed to various locations such as a manufacturing line of a factory.

Also, the control apparatus 2 can execute a passage formation mode in which a passage R through which the worker can pass is formed in the storage plane F. In this passage formation mode, the control apparatus 2 receives designation of a target position Pt (see FIG. 8, etc.) within the storage plane F, and when the target position Pt is designated, the control apparatus 2 forms a passage R though which the worker can pass, which connects from the outer edge E of the storage plane F to the target position Pt. The target position Pt is any position on the storage plane F, and is designated by the operator, for example. For example, if load collapse of a container C (container group Cg) or the like occurs in a portion of the storage plane F and a worker needs to work at the position where the load collapse or the like occurred, the position when the load collapse or the like occurred is designated as the target position Pt.

As shown in FIGS. 8 to 11, in the passage formation mode, the control apparatus 2 sets the passage area AR for ensuring the passage R, and causes the conveying apparatus 1 to move all of the containers C (container groups Cg) placed in the passage region AR to a location outside of the passage area AR on the storage plane F. In this embodiment, the area setting unit 22 described above sets the passage area AR. Note that, as described above, the single container C placed on the storage plane F is kept track of by the control apparatus 2 as a "container group Cg" having a stacking number of "1". Accordingly, hereinafter, the single container C will be referred to as a container group Cg in some cases.

The passage area AR is a virtual area that connects the target position Pt and the outer edge E, and is set regardless of whether or not a container C has actually been placed. After execution of the passage formation mode, there are no containers C in the passage area AR, and the passage R through which the worker can pass is formed in the region corresponding to the passage area AR.

In this embodiment, by executing the passage formation mode, the conveying apparatus 1 moves all of the containers C placed in the passage area AR to an empty region S in which no containers C (container groups Cg) are placed and which is outside of the passage area AR, or on top of a container group Cg placed in a location outside of the passage area AR.

Then, in the present embodiment, the control apparatus 2 updates the storage position information Ip stored in the storage unit 21 for the containers C moved by executing the passage formation mode. For example, when the passage R from the target position Pt to the outer edge E is manually formed by a worker, the types of the containers C moved to form the passage R and the positions of the containers C before movement are difficult for the control apparatus 2 to keep track of. In order for the control apparatus 2 to keep track of such information, it has been necessary for the worker to perform the task of storing the storage position information Ip of the moved containers C in the storage unit 21 by inputting it or the like. However, as in the above-described configuration, the control apparatus 2 can easily keep track of the types and positions of the containers C after movement by updating the storage position information Ip of the containers C that were moved by executing the passage formation mode. Accordingly, there is no need to return the containers C moved by executing the passage formation mode to the positions before movement, and the operation can be continued as-is.

In this embodiment, the control apparatus 2 receives designation of the setting condition T and sets the passage area AR according to the designated setting condition T when executing the passage formation mode. For example, if the setting condition T has been designated by the worker, the control apparatus 2 receives the designation, and sets the passage area AR with the area setting unit 22 according to the designated setting condition T.

In this embodiment, the setting condition T includes any one of a shortest distance condition Ta that minimizes the distance from the outer edge E to the target position Pt, a fewest articles condition Tb that minimizes the number of containers C placed in the passage area AR, and a passage direction condition Tc that sets the extension direction of the passage area AR. Note that in this embodiment, the fewest articles condition Tb is a condition for minimizing the number of container groups Cg placed in the passage area AR.

As shown in FIG. 5, in the present embodiment, the setting condition T includes a passage width condition Td that sets the size of the width of the passage area AR (passage width Rw: see FIG. 8, etc.). As shown in FIG. 8 and the like, the passage width Rw of the passage area AR is the dimension in the direction orthogonal to the direction in which the passage area AR extends. According to the above configuration, by setting the size of the passage width Rw according to various circumstances, it is possible to form a passage R having an appropriate passage width Rw. The circumstances considered here include, for example, the size of device such as a cart if it is necessary to cause the device to reach the target position Pt, the number of workers if a plurality of workers are heading to the target position Pt, or the like.

Figure 6:
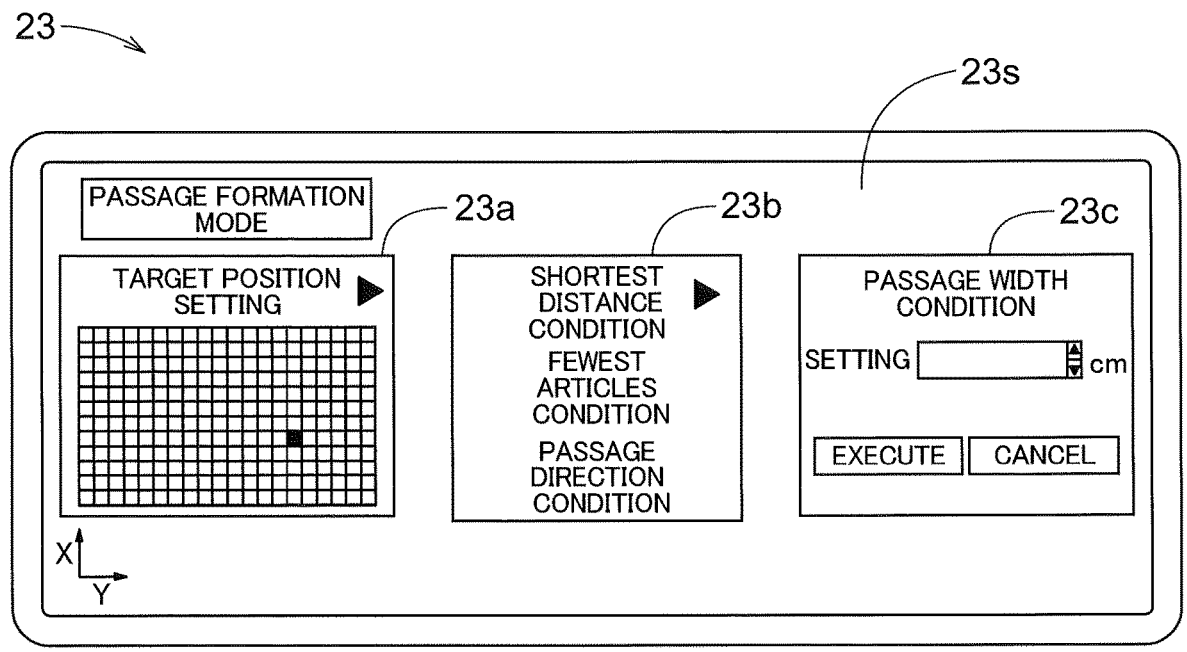
FIG. 6 is a diagram showing an example of an operation portion.

As shown in FIGS. 5 and 6, the control apparatus 2 according to this embodiment includes an operation unit 23 that can be operated by a worker. The operation unit 23 receives designation of the target position Pt through an operation performed by the worker. In this example, in addition to the target position Pt, the operation unit 23 receives designation of the setting condition T through an operation performed by the worker. The operation unit 23 also receives designation of the passage width condition Td through an operation performed by the worker.

As shown in FIG. 6, in this embodiment, the operation unit 23 has an operation screen 23S. In this example, the operation screen 23S is configured as a touch panel. A target position Pt can be set on the operation screen 23S, and in this example, a target position setting image 23a is displayed in which the worker can input or select the target position Pt. Also, the setting condition T can be set on the operation screen 23S, and in this example, a setting condition setting image 23b is displayed in which the worker can input or select the setting condition T from the shortest distance condition Ta, the fewest articles condition Tb, and the passage direction condition Tc. Furthermore, on the operation screen 23S, it is possible to set the passage width Rw of the passage area AR, and in this example, a passage width setting image 23c is displayed in which the worker can input or select the passage width Rw. In the example shown in FIG. 6, images in which the worker can input or select the target position Pt, the setting condition T, and the passage width Rw in the stated order (the target position setting image 23a, the setting condition setting image 23b, the passage width setting image 23c) are displayed on the operation screen 23S. Note that the operation unit 23 may also be configured such that various types of input are performed using a keyboard, a monitor, or the like.

Figure 7:
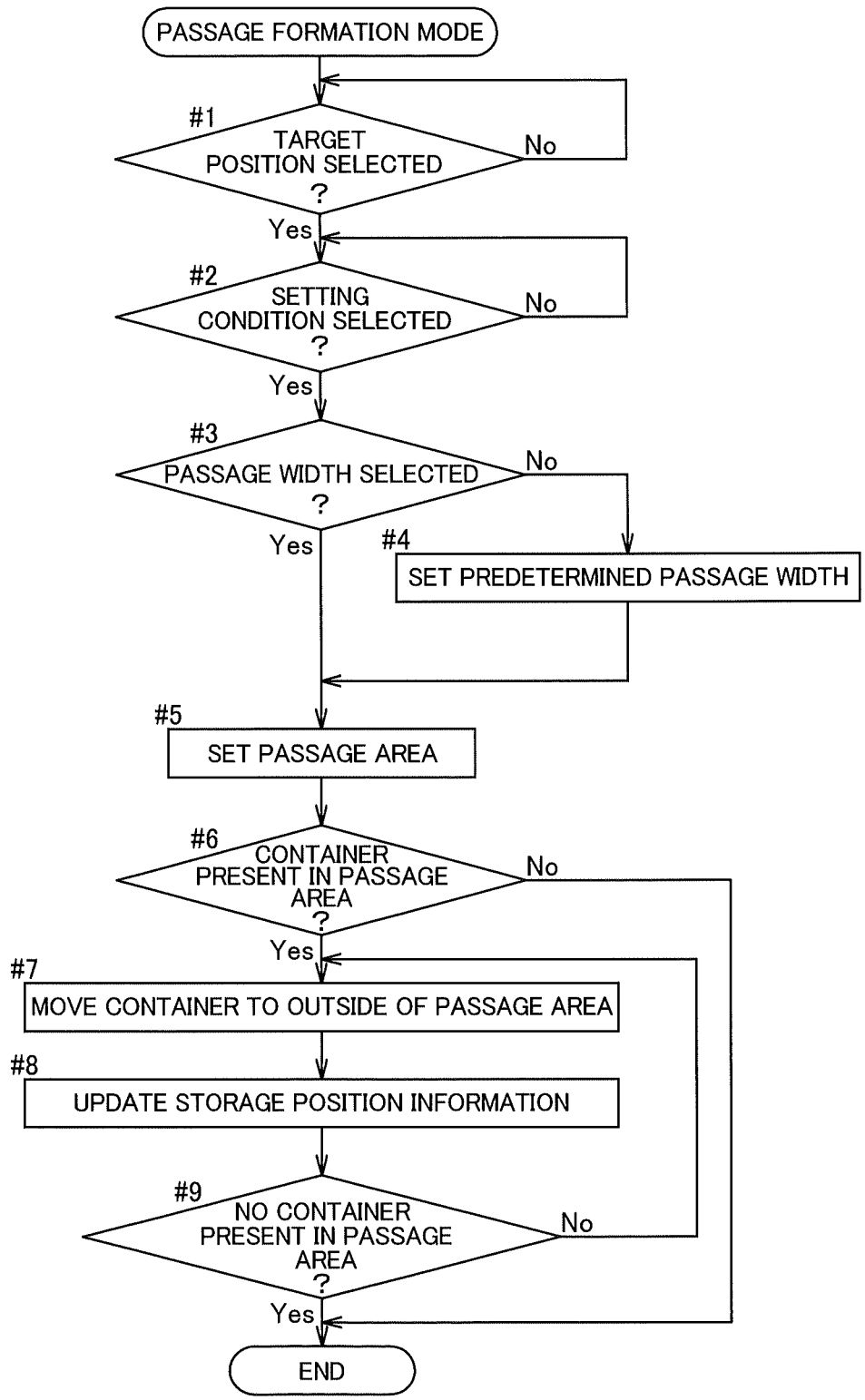
FIG. 7 is a flow chart showing a control procedure performed when executing a passage formation mode.

Next, a procedure in the case where the control apparatus 2 executes the passage formation mode will be described using the flowchart of FIG. 7.

When the passage formation mode is executed, the control apparatus 2 determines whether or not the target position Pt has been selected (step #1). If it is determined that the target position Pt has been selected (step #1: Yes), the control apparatus 2 determines whether or not the setting condition T has been selected (step #2). Then, if it is determined that the setting condition T has been selected (step #2: Yes), the control apparatus 2 determines whether or not the passage width Rw has been selected (step #3).

If it is determined that the passage width Rw has not been selected (step #3: No), the control apparatus 2 sets a predetermined passage width Rw (step #4), and sets the passage area AR based on the selected target position Pt and setting condition T and the predetermined passage width Rw (step #5). On the other hand, if it is determined that the passage width Rw has been selected (step #3: Yes), the control apparatus 2 sets the passage area AR based on the selected target position Pt, setting condition T, and passage width Rw (step #5). Note that the predetermined passage width Rw set in the process of step #4 need only be set to a width through which the worker can pass, and may be set within a range of 500 mm to 1500 mm, for example.

After setting the passage area AR (step #5), the control apparatus 2 determines whether or not there is a container C in the passage area AR (step #6). This determination is performed based on the storage location information Ip. If it is determined that there is a container C in the passage area AR (step #6: Yes), the control apparatus 2 moves the container C to a location outside of the passage area AR on the storage plane F (step #7). Then, the control apparatus 2 updates the storage position information Ip of the moved container C (step #8). Thereafter, if it is determined that there are no containers C in the passage area AR (step #9: Yes), the control apparatus 2 ends the passage formation mode. On the other hand, if the control apparatus 2 determines that there is still a container C in the passage area AR (step #9: No), steps #7 and #8 are repeated. Note that the control apparatus 2 sets the passage area AR (step #5), and in the subsequent step #6, if it is determined that there is no container C in the passage area AR (step #6: No), the control apparatus 2 ends the passage formation mode in the same manner as above.

Next, an example will be described in which a passage R is formed on the storage plane F by executing the passage formation mode based on each setting condition T.

FIG. 8 shows a case where the passage formation mode is executed under the shortest distance condition Ta. If the target position Pt has been designated and the shortest distance condition Ta has been specified as the setting condition T, the control apparatus 2 sets the passage area AR according to the shortest distance condition Ta.

In the present embodiment, if the shortest distance condition Ta has been designated as the setting condition T, the control apparatus 2 calculates the position on the outer edge E that is the closest to the target position Pt based on the storage position information Ip of the container group Cg placed at the target position Pt and sets the passage area AR between the calculated position and the target position Pt. The region surrounded by a two-dot chain line in FIG. 8 is the passage area AR set so as to satisfy the shortest distance condition Ta. In the illustrated example, the passage area AR is set between the target position Pt and the first outer edge E1, and container groups Cg have been placed at eight locations in the passage area AR. The control apparatus 2 moves the container groups Cg placed at the eight locations to locations outside of the passage area AR on the storage plane F. As described above, the location to which the container group Cg is to be moved is on top of another container group Cg placed at a location outside of the passage area AR on the storage plane F, or an empty region S. By executing the passage formation mode, as shown in the lower diagram of FIG. 8, all of the containers C placed in the passage area AR are removed, and a passage R through which the worker can pass is formed in the region corresponding to the passage area AR. By setting the setting condition T to the shortest distance condition Ta in this manner, it is possible to form a passage R that allows the worker to reach the target position Pt from the outer edge E in the shortest distance.

Also, in the present embodiment, if the shortest distance condition Ta is designated as the setting condition T, the control apparatus 2 sets the passage area AR such that the side of the outer edge E where the entrance G is provided is the starting point. Specifically, the control apparatus 2 sets the passage area AR starting from the position closest to the target position Pt on the side (outer edge E) on which the entrance G is provided. This makes it possible to form the passage R from a position close to the entrance G. FIG. 8 shows an example in which the shortest distance condition Ta is designated as the setting condition T, and the passage area AR is set starting from the first outer edge E1 where the entrance G. Note that in the example shown in FIG. 8, the passage area AR to be set does not differ depending on whether or not there is a condition that the side (first outer edge E1) of the outer edge E where the entrance G is provided is set as the starting point, but there are cases where a passage area AR different from that described above is set depending on which location is designated as the target position Pt. For example, regarding the second target position Pt2 shown in FIG. 8, if the passage area AR is set according to the shortest distance condition Ta without giving consideration to the side of the outer edge E where the entrance G is provided, the area indicated by "AR2" in FIG. 8 is set.

FIG. 9 shows a case where the passage formation mode is executed under the fewest articles condition Th. If the target position Pt is designated and the fewest articles condition Tb is designated as the setting condition T, the control apparatus 2 sets the passage area AR according to the fewest articles condition Th.

In this embodiment, if the fewest articles condition Tb is specified as the setting condition T, the control apparatus 2 sets the passage area AR in a region in which the number of container groups Cg placed between the target position Pt and the outer edge E is the smallest, based on the storage position information Ip of all the container groups Cg placed on the storage plane F. The region surrounded by a two-dot chain line in FIG. 9 is the passage area AR set so as to satisfy the fewest articles condition Th. In the illustrated example, the passage area AR is set between the target position Pt and the second outer edge E2, and the container groups Cg are placed at four locations in the passage area AR. The control apparatus 2 moves the container groups Cg placed at the four locations to a location outside of the passage area AR on the storage plane F. As a result, as shown in the lower diagram of FIG. 9, all of the containers C placed in the passage area AR are removed, and a passage R through which the worker can pass is formed in the region corresponding to the passage area AR. By setting the set condition T to the shortest distance condition Ta in this manner, the number of container groups Cg (or individual containers C) to be moved by the conveying apparatus 1 can be reduced, and the amount of time for the conveying apparatus 1 to form the passage R can be shortened.

Note that in the above description, a case was described in which the passage area AR is set according to the fewest articles condition Tb without giving consideration to the side of the outer edge E where the entrance G is provided. However, if the fewest articles condition Tb is designated as the setting condition T, the passage area AR may be set such that the side of the outer edge E where the entrance G is provided is the starting point. In this case, in this example, an area such as that indicated by "AR2" in FIG. 9 is set starting from the first outer edge E1 where the entrance G is provided, such that the number of container groups Cg that are present up to the target position Pt is minimized.

An example was described above in which the passage area AR is set in the case where the setting condition T is the shortest distance condition Ta or the case where the setting condition T is the fewest articles condition Th. However, it is not always the case that there is only one passage area AR that satisfies the shortest distance condition Ta, nor is it always the case that there is only one passage area AR that satisfies the fewest articles condition Th.

In view of this, for example, if the setting condition T is the shortest distance condition Ta and it is possible to set two or more passage regions AR that satisfy the shortest distance condition Ta, it is preferable that the control apparatus 2 sets, as the passage area AR, the candidate with the smallest number of container groups Cg included in each candidate among candidates for the two or more passage areas AR that satisfy the shortest distance condition Ta. As a result, among the candidates for the passage R for which the distance from the outer edge E to the target position Pt is the shortest, the candidate for which the formation time of the passage R by the conveying apparatus 1 is the shortest can be formed as the passage R.

Also, for example, if the setting condition T is the fewest articles condition Tb and two or more passage regions AR satisfying the fewest articles condition Tb can be set, it is preferable that the control apparatus 2 sets, as the passage area AR, the candidate for which the distance from the outer edge E to the target position Pt is the shortest among candidates for the two or more passage areas AR that satisfy the fewest articles condition Th. As a result, the candidate for which the distance from the outer edge E to the target position Pt is the shortest among the candidates with the shortest formation time of the passage R by the conveying apparatus 1 can be formed as the passage R.

Note that even if the above conditions are set, if a plurality of passage regions AR can be set, other conditions may be further added, or a passage area AR selected by the worker from among the plurality of passage regions AR may be set.

FIG. 10 shows a case where the passage formation mode is executed under the passage direction condition Tc. If the target position Pt is designated and the passage direction condition Tc is designated as the setting condition T, the control apparatus 2 sets the passage area AR according to the passage direction condition Tc.

In this embodiment, if the passage direction condition Tc is designated as the setting condition T, the control apparatus 2 sets the passage area AR along the direction designated by the passage direction condition Tc from the target position Pt. Due to the setting condition T being set as the passage direction condition Tc, the passage R can be formed along a direction according to various circumstances, with consideration given to circumstances such as the current position of the worker and the position of the entrance G to the storage plane F. For example, in FIG. 10, a direction along the Y direction is specified as the passage direction condition Tc. Note that in the illustrated example, the entrance G is provided at the fourth outer edge E4. The region surrounded by a two-dot chain line in FIG. 10 is the passage area AR set so as to satisfy the passage direction condition Tc. In the illustrated example, the passage area AR is set so as to extend in the Y direction from the target position Pt and reach the fourth outer edge E4, and the container groups Cg are placed at five locations in the passage area AR. The control apparatus 2 moves the container groups Cg placed at the five locations to locations outside of the passage are AR on the storage plane F. As described above, the location to which the container groups Cg are to be moved is on top of another container group Cg placed at a location outside of the passage area AR on the storage plane F, or an empty region S. By executing the passage formation mode, as shown in the lower diagram of FIG. 10, all of the containers C placed in the passage area AR are removed, and a passage R through which the work can pass is formed in the region corresponding to the passage area AR.

Also, FIG. 11 shows another example of a case in which the setting condition T is the passage direction condition 7b. In this example, the entrance G is provided at the first outer edge E1.

In this example, the path direction condition 1b includes conditions for the direction and distance extending from the target position Pt. If the passage direction condition 1b is designated as the setting condition T, the control apparatus 2 sets the passage area AR according to the extension direction and the distance from the target position Pt included in the passage direction condition Tc. The region surrounded by a two-dot chain line in FIG. 11 is the passage area AR set so as to satisfy the passage direction condition Tc. In FIG. 11, an example is shown in which the extending direction from the target position Pt is designated as the Y direction, the distance is designated as the first extending distance Ly, the extension direction from the target position Pt is designated as the X direction, the distance is designated as the second extension distance Lx, and thereby the passage area AR is set. In the illustrated example, container groups Cg are placed at five locations in the passage area AR. The control apparatus 2 moves the container groups Cg placed at the five locations to locations outside of the passage area AR on the storage plane F. As a result, as shown in the lower diagram of FIG. 11, all of the containers C placed in the passage area AR are removed, and a passage R through which the worker can pass is formed in the region corresponding to the passage area AR. In the example shown in FIG. 11, by setting the passage direction condition Tc as the setting condition T, the passage R is formed so as to connect the position closest to the entrance G on the first outer edge E1 (outer edge E) and the target position Pt.

Here, depending on the storage status of the containers C on the storage plane F, there are cases where there is a lack of empty regions S for moving the containers C placed in the passage area AR after setting the passage area AR.

Figure 12:
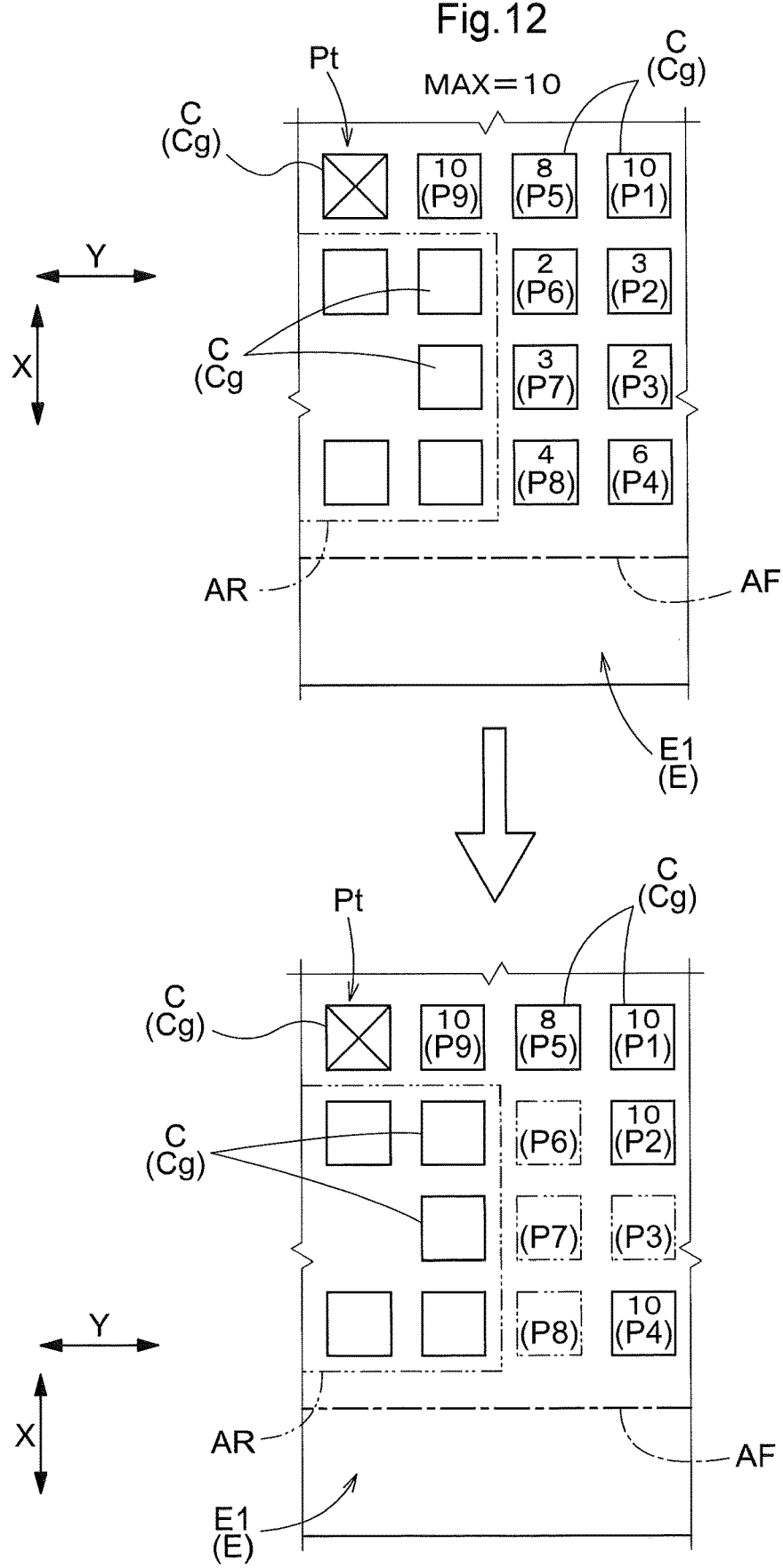
FIG. 12 is an explanatory diagram showing a case where empty region ensuring processing is executed.

In view of this, in the present embodiment, as shown in FIG. 12, if there is a lack of locations (empty regions S) within the storage plane F for moving all of the containers C placed in the passage area AR when the passage formation mode is executed, the control apparatus 2 executes processing (empty region ensuring processing) for ensuring locations (empty regions S) for increasing the stacking numbers of the containers C stored in the storage plane F by the conveying apparatus 1 to increase the storage capacity in the storage plane F and ensure locations (empty regions S) for moving all of the containers C placed in the passage area AR. In this example, in the empty region ensuring processing, the control apparatus 2 ensures the empty regions S by increasing the stacking number of the containers C placed at locations outside of the passage area AR on the storage plane F without exceeding a maximum stacking number, which is a pre-set upper limit of the stacking number of the containers C.

FIG. 12 illustrates a case where the maximum stacking number on the storage plane F is "10", and the numbers shown inside the container groups Cg in the figure indicate the stacking numbers of the current containers C in each container group Cg. Note that for convenience of description, FIG. 12 shows the positions where the plurality of container groups Cg are stored as first to ninth storage positions (P1 to P9).

In the example shown in FIG. 12, there are no empty regions S in which no containers C are placed, around at least the passage area AR on the storage plane F. In this case, the control apparatus 2 executes the empty region ensuring processing, and controls the conveying apparatus 1 such that the number of container groups Cg is reduced by combining the plurality of container groups Cg with a stacking number less than or equal to the maximum stacking number around the passage area AR and that can be stacked together and forming a new container group Cg with a stacking number less than or equal to the maximum stacking number. Note that FIG. 12 illustrates a case where all the container groups Cg are constituted by containers C of the same size and can be stacked on each other. Note that if container groups Cg constituted by containers C of different sizes that cannot be stacked together exist together, the above-described control is performed only for stackable container groups Cg.

In the example shown in FIG. 12, a new container group Cg with a stacking number of "10" is formed at a second storage position P2 by combining the container group Cg (stacking number: 2) placed at a third storage position P3, a container group Cg (stacking number: 2) placed at a sixth storage position P6, and a container group Cg (stacking number: 3) placed at a seventh storage position P7 with the container group Cg (stacking number: 3) placed at the second storage position P2. As a result, an empty region S where no container C is placed is formed at each of the third storage position P3, the sixth storage position P6, and the seventh storage position P7. Also, a new container group Cg with a stacking number of "10" is formed at a fourth storage position P4 by combining a container group Cg (stacking number: 4) placed at an eighth storage position P8 with a container group Cg (stacking number: 6) placed at the fourth storage position P4. As a result, an empty region S where no container C is placed is formed at the eighth storage position P8. Then, the control apparatus 2 controls the conveying apparatus 1 so as to move the containers C placed in the passage area AR to the plurality of empty regions S formed as described above.

[Other Embodiments]

Next, other embodiments of the plane storage facility will be described.

(1) In the above embodiment, an example was described in which the fewest articles condition Tb is a condition that minimizes the number of container groups Cg placed in the passage area AR. However, there is no limitation to such an example, and the fewest articles condition Tb may also be a condition that minimizes the number of containers C placed in the passage area AR. That is, in this case, the control apparatus 2 sets the passage area AR such that the number of containers C in the passage area AR is minimized, with consideration given to the number and the stacking numbers of the container groups Cg placed in the passage area AR.

(2) In the above embodiment, an example was described in which the storage plane F is formed in a rectangular shape, and the outer edge E is formed along the four sides of the rectangular storage plane F. However, the shape of the storage plane F is not limited to such an example, and various shapes such as a polygonal shape, a circular shape, and an elliptical shape can be employed. Also, regardless of the shape of the storage plane F, the outer edge E through which the worker can pass is not essential, and the entire storage plane F may be the storage area AF.

(3) In the above embodiment, an example was described in which the entrance G is provided at the first outer edge E1. However, there is no limitation to such an example, and if the storage plane F is formed in a rectangular shape, the entrance G may also be provided at the second outer edge E2, the third outer edge E3, or the fourth outer edge E4. Also, there may be one entrance G or a plurality of entrances G.

(4) In the above embodiment, when executing the passage formation mode, the control apparatus 2 receives designation of the setting condition T and sets the passage area AR according to the designated setting condition T. However, there is no limitation to such an example, and the control apparatus 2 may automatically set the passage area AR without receiving the setting condition T. In this case, the control apparatus 2 sets the passage area AR according to a predetermined condition. The predetermined condition may be any one of the shortest distance condition Ta, the fewest articles condition Tb, and the passage direction condition IT described above, or may be a condition different from these conditions.

(5) In the above embodiment, an example was described in which the target article is a container C, a plurality of which can be stacked. However, there is no limitation to such an example, and the target article may also be a container C that cannot be stacked, or may be various articles other than the container C.

(6) In the above embodiment, an example was described in which the movement mechanism 11 includes the Y-direction moving body 11Y formed in a rail shape and the X-direction moving body 11X constituted by a cart traveling along the Y-direction moving body 11Y. However, there is no limitation to such an example, and the moving mechanism 11 need only be able to move the gripping portion 101 for gripping the container C in both the X direction and the Y direction. For example, the moving mechanism 11 may also be constituted by a robot arm or the like capable of moving the gripping portion 101 in the X, Y, and Z directions.

(7) Note that the configurations disclosed in the above-described embodiments can be applied in combination with configurations disclosed in other embodiments as long as no contradiction arises. Regarding other configurations as well, the embodiments disclosed in this specification are merely examples in all respects. Accordingly, various modifications can be made as appropriate without departing from the gist of the present disclosure.

[Overview of the Above-Described Embodiments]

The plane storage facility described above will be described hereinafter.

The plane storage facility according to the present disclosure includes:

a storage plane on which a plurality of target articles are placed and stored;

a conveying apparatus configured to move the target articles within the storage plane; and a control apparatus configured to control operation of the conveying apparatus, wherein the control apparatus receives designation of a target position within the storage plane, and in response to the target position being designated, is capable of executing a passage formation mode for forming a passage that connects an outer edge of the storage plane to the target position and through which a worker is capable of passing, and in the passage formation mode, the control apparatus sets a passage region for ensuring the passage, and moves all of the target articles placed in the passage region to a location outside of the passage area in the storage plane with the conveying apparatus.

According to this configuration, it is not necessary to ensure a passage through which a worker can pass on the storage plane. For this reason, compared to the case of ensuring such a passage, it is possible to ensure a wider region that can be used for storing the target article, and it is possible to improve the storage efficiency of the target article. Also, according to this configuration, if the target position is designated on the storage plane, the passage formation mode for forming a passage connecting the outer edge of the storage plane to the target position is executed. This makes it possible to form a passage for the worker to reach any target position using the conveying apparatus. For example, if there is a load collapse or the like of the target articles in part of the storage plane and it becomes necessary for the worker to perform a task at the position where the load collapse or the like occurred, it is possible to set the position where the load collapse or the like occurred as a target position and form a passage to the target position on the storage plane. As described above, according to this configuration, a plane storage facility can be formed in which it is possible to improve the storage efficiency of the target articles in the storage plane in which a plurality of target articles are stored, and to form a passage through which a worker can pass as needed.

Here:

it is preferable that the control apparatus includes a storage unit configured to, for each of the target articles stored on the storage plane, store identification information for identifying the target article and storage position information indicating a position where the target article is stored, in association with each other, and the control apparatus updates the storage position information for the target article moved by executing the passage formation mode.

According to this configuration, it is easy to manage the target articles stored on the storage plane. Furthermore, since the storage position information is updated for the target article that has been moved by executing the passage formation mode, it is possible to keep track of the position where the target article that was moved is stored. Accordingly, there is no need to return the target article moved by executing the passage formation mode to the position before movement, and operation can be continued as-is.

Also:

it is preferable that while executing the passage formation mode, the control apparatus receives designation of a setting condition and sets the passage area according to the designated setting condition.

According to this configuration, the passage can be formed in the passage area set according to the setting condition.

Also, in the configuration in which the control apparatus sets the passage area according to the designated setting condition, it is preferable that the setting condition includes any one of: a shortest distance condition for minimizing the distance from the outer edge to the target position, a fewest articles condition for minimizing the number of target articles placed in the passage area, and a passage direction condition for setting an extension direction of the passage area.

According to this configuration, it is possible to set the passage area by selecting an appropriate setting condition according to the circumstance at that time. For example, by setting the shortest distance condition as the setting condition, it is possible to form a passage that allows the worker to reach the target position from the outer edge in the shortest distance. Also, by setting the fewest articles condition as the setting condition, the number of target articles to be moved by the conveying apparatus can be reduced and the amount of time for the conveying apparatus to form the passage can be shortened. Also, by setting the passage direction condition as the setting condition, it is possible to form the passage along the direction according to various circumstances, with consideration given to the current position of the worker, the position of the entrance to the storage plane, and the like.

Also, in the configuration in which the installation condition includes any one of the shortest distance condition, the fewest articles condition, and the path direction condition:
  it is preferable that the storage plane is formed in a rectangular shape,
  the outer edge is formed over four sides of the rectangular storage plane,
  an entrance through which the worker is capable of entering and exiting is provided on one of four sides forming the outer edge, and
  in response to either the shortest distance condition or the fewest articles condition being designated as the setting condition, the control apparatus sets the passage area such that the side of the outer edge where the entrance is provided is a starting point.

According to this configuration, if either the shortest distance condition or the fewest articles condition is designated as the set condition, the passage can be formed from a position near the entrance.

Also, in the configuration in which the control apparatus sets the passage area according to the designated setting condition, it is preferable that the setting condition includes a passage width condition for setting a size of a width of the passage region.

According to this configuration, the width of the passage can be set according to various circumstances. Circumstances considered here include, for example, the size of a device such as a cart if it is necessary for the device to reach the target position, the number of workers if a plurality of workers are heading to the target position, and the like.

Also:
  it is preferable that the target article is a container, a plurality of the target articles being stackable, and
  while executing the aisle formation mode, in response to there being a lack of locations in the storage plane for moving all of the target articles placed in the passage area, the control apparatus executes processing for increasing a stacking number of the target articles stored on the storage plane with the conveying apparatus to increase the storage capacity within the storage plane and ensure a location for moving all of the target articles placed within the passage area.

According to this configuration, even if there is a lack of locations for moving all of the target articles placed in the passage area in the storage plane, processing for ensuring locations that make up for the lack is executed, and therefore the passage can be appropriately formed.

Also:
  it is preferable that, with directions extending along the storage plane and perpendicular to each other being an X direction and a Y direction, and a direction perpendicular to the storage plane being a Z direction, and
  the conveying apparatus includes a gripping portion configured to grip the target articles, a moving mechanism configured to move the gripping portion in the X direction and the Y direction, and an elevating mechanism configured to raise and lower the gripping portion along the Z direction.

According to this configuration, the target article can be appropriately moved to each position within the storage plane.

INDUSTRIAL APPLICABILITY

The technique according to the present disclosure can be used in a plane storage facility including a storage plane on which a plurality of target articles are placed and stored, a conveying apparatus that moves the target articles within the storage plane, and a control apparatus that controls the operation of the conveying apparatus.

DESCRIPTION OF REFERENCE SIGNS

100 Plane storage facility
1 Conveying apparatus
11 Moving mechanism
101 Gripping portion
12 Elevating mechanism
2 Control apparatus
21 Storage unit
AR Passage area
R Passage
Rw Passage width
F Storage plane
E Outer edge
G Entrance
S Empty region
C Container (target article)
Pt Target position
Ii Identification information
Ip Storage position information
T Setting condition
Ta Shortest distance condition
Tb Fewest articles condition
IT Passage direction condition
Td Passage width condition

The invention claimed is:
1. A plane storage facility comprising:
a storage plane on which a plurality of target articles are placed and stored;
a conveying apparatus configured to move the target articles within the storage plane; and
a control apparatus configured to control operation of the conveying apparatus, wherein the control apparatus receives designation of a target position within the storage plane and, in response to the target position being designated, is capable of executing a passage formation mode for forming a passage that connects an outer edge of the storage plane to the target position and through which a worker is capable of passing, wherein in the passage formation mode, the control apparatus sets a passage area for ensuring the passage, and moves all of the target articles placed in the passage area to a location outside of a passage area in the storage plane with the conveying apparatus;

wherein while executing the passage formation mode, the control apparatus receives designation of a setting condition and sets the passage area according to the designated setting condition; and, wherein the setting condition includes any one of:

a shortest distance condition for minimizing the distance from the outer edge to the target position, a fewest articles condition for minimizing the number of target articles placed in the passage area, and a passage direction condition for setting an extension direction of the passage area.

2. The plane storage facility according to claim 1, wherein the control apparatus comprises a storage unit configured to, for each of the target articles stored on the storage plane, store identification information for identifying the target article and storage position information indicating a position where the target article is stored, in association with each other, and wherein the control apparatus updates the storage position information for the target article moved by executing the passage formation mode.

3. The plane storage facility according to claim 1, wherein:

the storage plane is formed in a rectangular shape, the outer edge is formed over four sides of the rectangular storage plane, an entrance through which the worker is capable of entering and exiting is provided on one of four sides forming the outer edge, and in response to either the shortest distance condition or the fewest articles condition being designated as the setting condition, the control apparatus sets the passage area such that the side of the outer edge where the entrance is provided is a starting point.

4. The plane storage facility according to claim 1, wherein the setting condition includes a passage width condition for setting a size of a width of the passage area.

5. The plane storage facility according to claim 1, wherein the target article is a container, and a plurality of the target articles are stackable, and wherein in response to there being a lack of locations in the storage plane for moving all of the target articles placed in the passage area, the control apparatus executes processing for increasing a stacking number of the target articles stored on the storage plane with the conveying apparatus to increase the storage capacity within the storage plane and ensure a location for moving all of the target articles placed within the passage area.

6. The plane storage facility according to claim 1, wherein, directions extending along the storage plane and perpendicular to each other are an X direction and a Y direction, and a direction perpendicular to the storage plane is a Z direction, and wherein the conveying apparatus comprises a gripping portion configured to grip the target articles, a moving mechanism configured to move the gripping portion in the X direction and the Y direction, and an elevating mechanism configured to raise and lower the gripping portion along the Z direction.

7. A method for controlling the plane storage facility of claim 1, the method comprising the steps of:

receiving designation of a target position within the storage plane; and, executing a passage formation mode for forming a passage that connects an outer edge of the storage plane to the target position and through which a worker is capable of passing, wherein in the passage formation mode comprises, setting a passage area for ensuring the passage; and, moving all of the target articles placed in the passage area to a location outside of the passage area in the storage plane with the conveying apparatus.

8. The method according to claim 7 further comprising the steps of:

storing identification information for identifying the target article and storage position information indicating a position where the target article is stored; and, updating the storage position information for the target article moved by executing the passage formation mode.

9. The method according to claim 7 further comprising the steps of:

while executing the passage formation mode, receiving designation of a setting condition and setting the passage area according to the designated setting condition.

10. The method according to claim 9, wherein the setting condition includes any one of:

a shortest distance condition for minimizing the distance from the outer edge to the target position, a fewest articles condition for minimizing the number of target articles placed in the passage area, and a passage direction condition for setting an extension direction of the passage area.

11. The method according to claim 9, wherein the setting condition includes a passage width condition for setting a size of a width of the passage area.

12. The method according to claim 7 further comprising the step of:

increasing a stacking number of the target articles stored on the storage plane with the conveying apparatus to increase the storage capacity within the storage plane and ensure a location for moving all of the target articles placed within the passage area.

13. The method according to claim 1, wherein a conveying apparatus is configured to move the plurality of target articles within the storage plane, and wherein the conveying apparatus comprises:

a gripping portion configured to grip the target articles;

a moving mechanism configured to move the gripping portion in at least one direction; and an elevating mechanism configured to raise and lower the gripping portion in at least one direction.

14. A method for controlling a plane storage facility, the method comprising the steps of:

storing a plurality of target articles on a storage plane;

designating a target position within the storage plane;

executing a passage formation mode for forming a passage that connects an outer edge of the storage plane to the target position;

setting a passage area for ensuring formation of the passage;

moving the plurality of target articles placed in the passage area to a location outside of the passage area in the storage plane, wherein the passage is configured to allow a worker to pass therethrough.

15. The method according to claim 14, further comprising the steps of:

storing identification information for identifying the plurality of target articles;

storing storage passage information indicating a position where each of the plurality of target articles are stored; and updating storage position information for each of the plurality of target articles moved, wherein the identification information and storage passage information are stored in association with each other.

16. The method according to claim 14, further comprising the steps of:

designating a setting condition; and setting the passage area according to the designated setting condition.

17. The method according to claim 16, wherein the setting condition comprises any one of:

a shortest distance condition for minimizing the distance from the outer edge to the target position, a fewest articles condition for minimizing the number of target articles placed in the passage area, and a passage direction condition for setting an extension direction of the passage area.

18. The method according to claim 17, wherein:

the storage plane is formed in a rectangular shape, the outer edge is formed over four sides of the rectangular storage plane, an entrance through which the worker is capable of entering and exiting is provided on one of the four sides forming the outer edge, and in response to either the shortest distance condition or the fewest articles condition being designated as the setting condition, the control apparatus sets the passage area such that the side of the outer edge where the entrance is provided is a starting point.

19. The method according to claim 16, wherein the setting condition comprises a passage width condition for setting a size width of the passage area.

20. The method according to claim 14, wherein the plurality of target articles are stackable containers, and wherein the method further comprises the steps of:

executing an aisle formation mode in response to there being a lack of locations in the storage plane for moving all of the target articles placed in the passage area, the aisle formation mode comprising stacking at least some of the plurality of target articles placed within the passage area; and increasing a stacking number of the plurality of target articles stored on the storage plane to increase the storage capacity in the storage plane and ensure a location for moving all of the target articles placed within the passage area.

\* \* \* \* \*